United States Patent [19]

van der Smissen

[11] Patent Number: 4,623,637
[45] Date of Patent: Nov. 18, 1986

[54] PROCESS FOR PRODUCING A CATALYST FOR OXIDIZING CARBON MONOXIDE AND AIR FILTER PRODUCED BY THE PROCESS

[75] Inventor: Carl-Ernst van der Smissen, Lübeck, Fed. Rep. of Germany

[73] Assignee: Drägerwerk AG, Fed. Rep. of Germany

[21] Appl. No.: 809,510

[22] Filed: Dec. 16, 1985

[30] Foreign Application Priority Data

Dec. 15, 1984 [DE] Fed. Rep. of Germany ....... 3445803
Dec. 11, 1985 [DE] Fed. Rep. of Germany ....... 3543719

[51] Int. Cl.$^4$ .......................... B01J 21/04; B01J 23/64
[52] U.S. Cl. ..................................... 502/333; 423/247
[58] Field of Search .................... 502/333; 423/213.5, 423/247

[56] References Cited

U.S. PATENT DOCUMENTS 3,758,666  9/1973  Frevel et al. .......................... 423/247
3,830,757  8/1974  Evnin et al. .......................... 502/333
3,882,048  5/1975  Thelen et al. ......................... 502/333

Primary Examiner—W. J. Shine
Attorney, Agent, or Firm—McGlew and Tuttle

[57] ABSTRACT

In CO-air filters the poisonous carbon monoxide contained in the air to be breathed is brought into reaction with atmospheric oxygen on the surface of a CO catalyst and thus removed. The Pt-catalyst used to date as air filter material offers diminished protection when humidity levels in the air are high. By being subjected to an extra impregnation with vanadium compounds the capacity of the palladium catalyst to catalyze the oxidation of CO under high humidity is increased remarkably. Effectiveness is even increased under dry conditions.

2 Claims, No Drawings

PROCESS FOR PRODUCING A CATALYST FOR OXIDIZING CARBON MONOXIDE AND AIR FILTER PRODUCED BY THE PROCESS

FIELD AND BACKGROUND OF THE INVENTION

The invention relates in general to the construction of filters and particularly to a new and useful air purifier for use with respirators and similar devices.

The invention particularly relates to a process for producing a catalyst for oxidizing carbon monoxide with a carrier of aluminum oxide.

A catalyst of this type is used as air purification means in air filters and is known from the ASME publication of the American Society of Mechanical Engineers, Issue 77-ENAS-28. It will be referred to hereinafter after as Pt-catalyst.

Platinum metals on carrier materials catalyze the conversion of CO, with atmospheric oxygen in this case. This property is utilized on granulated carriers containing platinum metals as filter material for CO-filters. Whereas Hopkalit, which is also known as air purifier for CO-filters, loses its effectiveness under the influence of moisture in the air, the filter material with a Pt-catalyst is largely resistant to humidity. But a certain decline of activity is observed at higher humidity and temporarily also at high CO-concentrations, and a larger volume of filter material must be provided to compensate for these situations. Beside the increased expenditure and need for space, this involves also an additional load on the carrier for the use in respirator filters, for example.

German examined Patent Disclosure No. 22 14 056 discloses a catalyst and a process for producing it that is useful in the reduction of nitrogen compounds. The process involves the addition of palladium and vanadium in a specified percentage by weight to an aluminum oxide carrier. In the process at least 20% of the aluminum oxide that constitutes the carrier material is transformed into spinel.

It has been found that catalyst of this type is not a good catalyst for oxidizing pollutants in air to be breathed, particularly carbon monoxide. The high percentage of spinel in the aluminum oxide tends to prevent it. However, even a reduction of the proportion of spinel does not produce success, because in the presence of moisture and a potentially high proportion of carbon monoxide in the air to be breathed, with the piror art catalyst the oxidation of carbon monoxide is not catalyzed sufficiently, even when the spinel percentage is reduced virtually to nil.

SUMMARY OF THE INVENTION

The problem that the present invention seeks to solve is to improve the process for producing a catalyst of the aforementioned type so that the catalyst produced will not experience a reduction in performance even in the face of high humidity and CO concentrations in the air and will thus make it possible to have a smaller and lighter filter lining.

This problem is resolved by having the carrier made of a high-purity aluminum oxide (purity percentage of more than 99%) which is steeped in an aqueous solution of ammonium vanadate for impregnation with 1% vanadium by weight, the impregnated carrier then being dried in a vacuum and heated at approximately 200° C. to convert the ammonium vanadate into vanadium pentoxide, then steeped in an aqueous solution of palladium chloride for impregnation with 0.5% palladium by weight, and finally dried and treated with a strongly diluted hydrazine solution, the palladium chloride then being reduced, the hydrazine solution decanted and the doubly impregnated carried washed with water.

The advantages obtained with the invention are particularly a content in the palladium catalyst of substances in the form of the vanadium compounds, e.g. oxides or vanadates, that are not affected in their oxidation capacity by higher humidity. The observable decline in the activity of the palladium catalyst is thereby prevented. The capacity for catalytic CO-oxidation achieved under dry conditions by the use of the palladium metal on the carrier is not impaired by the impregnation with vanadium. Whereas double-impregnations frequently result in a decrease in one property to the advantage of another property, the palladium impregnation and the vanadium impregnation do not interfere with each other. On the contrary, an increase in the effectiveness under dry and under moist conditions as well as a stabilization against the occurrence of high CO concentrations result from the two impregnations.

Accordingly it is an object of the invention to provide an air filter comprising a carrier with a catalyst of a metal of a platinum group thereon and in addition a vanadium compound over the catalyst.

A further object of the invention is to provide an air filter for respirators comprising an aluminum oxide carrier, an aqueous solution of ammonium vanadate saturating the carrier and providing an vanadium content of 1% by weight on said carrier, an aqueous solution of palladium chloride over said vanadium pentoxide to produce a concentration of 0.5% by weight of palladium on the carrier, the carrier being treated with a dilute hydrazine solution and dried.

A further object of the invention is to provide a process of forming a filter which comprises saturating an aluminum oxide carrier with an aqueous solution of ammonium vanadate to obtain a vanadium content of 1% by weight on said carrier, drying the carrier under a vacuum and heating it to 200° C. to convert the ammonium vanadate into vanadium pentoxide, saturating the vanadium pentoxide with an aqueous solution of palladium chloride to produce a concentration of 0.5% by weight of palladium on said carrier, drying the carrier and treating it with dilute hydrazine solution, pouring off the hydrazine solution after the reduction of the palladium chloride on the carrier, drying the carrier.

A further object of the invention is to provide a filter which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the descriptive matter in which a preferred embodiment of the invention is illustrated.

DESCRIPTION OF THE PREFERRED EMBODIMENT

Among the vanadium oxide suitable beside vanadium (IV)-oxide and vanadium (III)-oxide is particularly vanadium pentoxide because of its strong oxidation-catalyzing property. Among the vanadates, the corresponding holds true for vanadate (V), but vanadate (IV) is also suitable.

Especially useful among the known carriers is α-aluminum oxide because of its moisture-regulating effect. This maintains the air purifier constantly in a range of moderate moisture, at which its effectiveness is greatest.

A palladium catalyst according to the invention is constructed as described below:

A granulated, porous carrier of activated charcoal, activated alumina, silica gel or zeolite supports a layer of vanadium compound, e.g. vanadium pentoxide, vanadium (IV)-oxide, vanadium (III)-oxide, alkali vanadate (V), alkali vanadate (IV) or heavy metal vanadate, on which platinum, palladium, rhodium or urthenium is located. The platinum group metals may be carried in the elemental state, as oxide or as salt, e.g. chloride, on the first impregnation. Depending on the moisture content of the carrier, the platinum metals in the different forms have different levels of activity. If the carrier is very dry, the elemental platinum metals are especially effective. At moderate moisture of the carrier, a certain percentage of the oxides of the platinum metals increases the effectiveness, whereas an addition of platinum metal chlorides is advantageous with high levels of moisture. For practical application, consequently, the attempt will be made to have platinum metals in all three forms on the carrier. Also to advantage may be the addition of other metallic oxides, e.g. zinc oxide, or metallic salts such as chlorides or chromates, to the vanadium compounds on the carrier for specific gas retention action.

The construction and preparation of an air purifier according to the invention shall be explained with an example:

The α-aluminum oxide as carrier is saturated with an aqueous solution of ammonium vanadate to obtain a content of vanadium 1% by weight on the carrier. The impregnated carrier is dried under vacuum and then heated to 200° C., to convert the ammonium vanadate into vanadium pentoxide. The carrier with the vanadium pentoxide is then saturated with an aqueous solution of palladium chloride, to produce a concentration of 0.5% by weight palladium on the carrier. The saturated carrier is dried and then treated with a very dilute hydrazine solution. After the reduction of the palladium chloride on the carrier, the hydrazine solution is poured off and the double impregnated carrier is washed with water. The fitler material is then dried. The finished filter material has an excellent oxidation effect on CO under dry conditions as well as in equilibrium with 80% relative humidity at 23° C., at low concentrations of few ml CO per $m^3$ air, as well as at high concentrations of 1.0% and 1.5% CO.

While a specific embodiment of the invention has been shown and described in detail to illustrate the application of the principles of the invention, it will be understood that the invention may be embodied otherwise without departing from such principles.

What is claimed is:

1. A process for producing a catalyst for oxidizing carbon monoxide and with a carrier of aluminum oxide comprising, making the carrier out of high-purity α-aluminum oxide with percentage purity more than about 99%, steeping the carrier in an aqueous solution of ammonium vanadate for impregnation with 1% vanadium by weight, drying the impregnated carrier in a vacuum, then heating the impregnated carrier at approximately 200° C. to convert the ammonium vanadate into vanadium pentoxide, then steeping the carrier containing vanadium pentoxide in an aqueous solution of palladium chloride for impregnation with 0.5% palladium by weight, thereafter drying the carrier, treating the carrier with a heavily diluted hydrazine solution, the palladium chloride being reduced, decanting the hydrazine solution, and washing the impregnated carrier with water.

2. A breathing air filter product made by the process according to claim 1.

* * * * *